United States Patent

[11] 3,599,726

| [72] | Inventor | Leonard D. Iacurci |
| | | 3701 Wenzler Drive, Kettering, Ohio 45429 |
| [21] | Appl. No. | 831,454 |
| [22] | Filed | June 9, 1969 |
| [45] | Patented | Aug. 17, 1971 |

[54] EDGING TOOL
3 Claims, 6 Drawing Figs.

[52] U.S. Cl. ............................................. 172/17, 172/381
[51] Int. Cl. ........................................... A01b 45/00, A01b 1/00
[50] Field of Search ........................................... 172/16, 13, 17, 15, 18, 381, 604; 294/49

[56] References Cited
UNITED STATES PATENTS

| 978,478 | 12/1910 | Norman | 172/13 |
| 1,693,808 | 12/1928 | Catudal | 172/17 |
| 2,105,007 | 1/1938 | Ready | 294/49 |
| 2,199,072 | 4/1940 | Garabrant | 294/49 |
| 2,568,468 | 9/1951 | Smith | 172/17 |
| 3,139,940 | 7/1964 | Randell | 172/17 X |
| 3,503,448 | 3/1970 | Schwartz et al. | 172/18 |

Primary Examiner—Robert E. Pulfrey
Assistant Examiner—Stephen C. Pellegrino
Attorney—William R. Jacox

ABSTRACT: An edging tool for trimming a lawn along the edges of curbs, walks and areas adjacent walls, steps or the like. The edging tool includes an operating handle or stem, a cutting member secured thereto adjacent one end thereof, and a rotatable wheel for support of the stem and cutting member. The cutting member has a first cutting edge and a second cutting edge. The cutting edges are arranged so that one cutting edge is used when the edging tool is moved in one direction, and the other cutting edge is used when the edging tool is moved in the opposite direction. Thus, the trimming of lawns near abutments such as steps, walls, or the like may be accomplished easily and readily.

PATENTED AUG17 1971
3,599,726
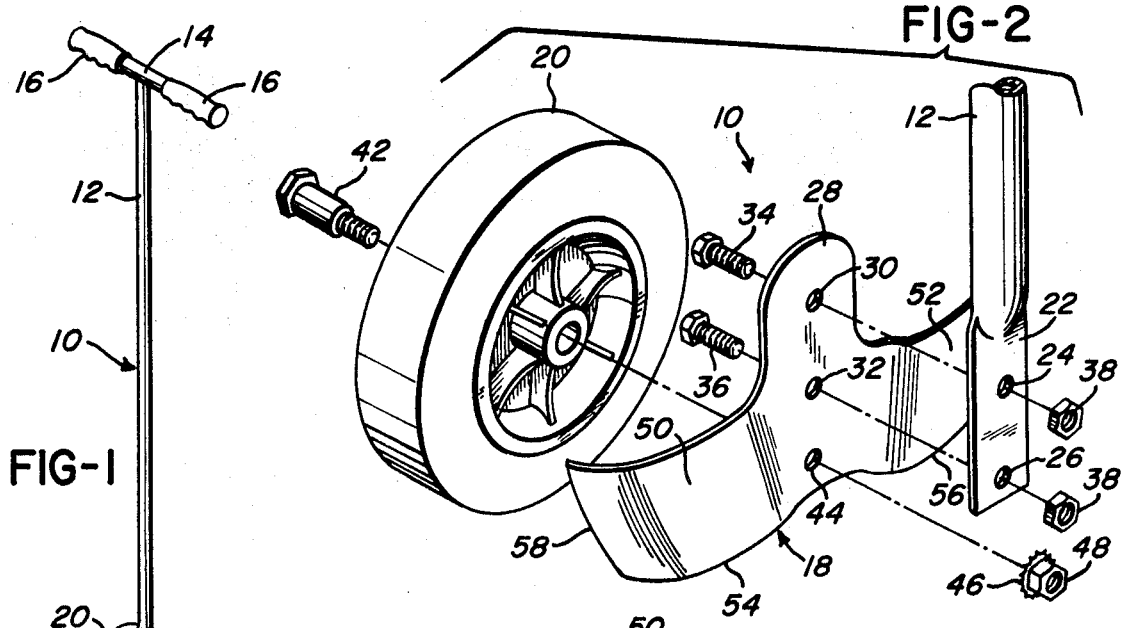
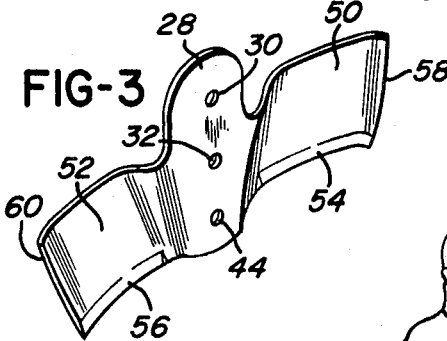
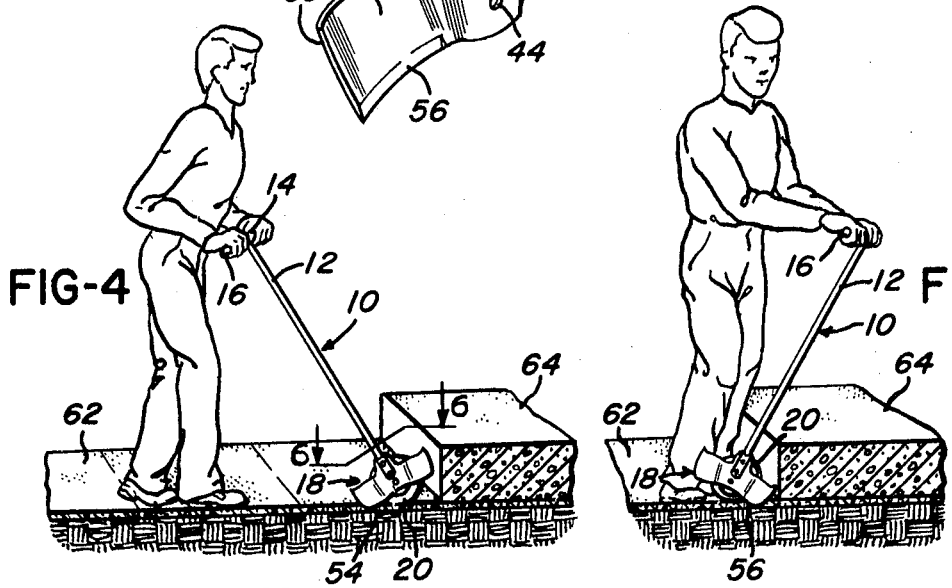
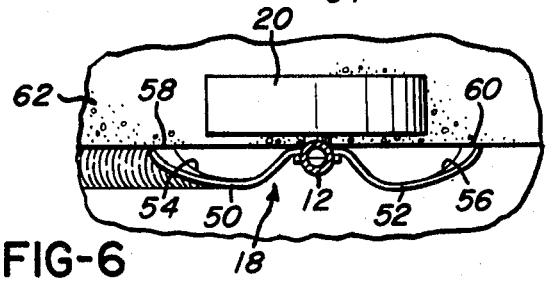
INVENTOR
LEONARD D. IACURCI
BY *William R Jacox*
ATTORNEY

EDGING TOOL

BACKGROUND OF THE INVENTION

This invention relates to an edging tool which is particularly adapted for trimming a strip adjacent an edge of a surface such as a sidewalk and is especially useful in trimming such a strip which is near an abutment, such as a step.

One of the problems encountered in prior art edging tools is that they are not capable of trimming along the edge of a walk which is immediately adjacent an abutment such as a step or the like.

A prior art edging tool of the same general type as the edging tool of the present invention is shown in U.S. Pat. No. Des. 203,846 which issued to the assignee of this application on Feb. 22, 1966.

Accordingly, an object of this invention is to provide an economical edging tool which is especially adaptable for trimming lawn areas and strips adjacent the edge of a surface near an abutment, such as a step.

Another object of this invention is to provide such an edging tool which facilitates cleaning away or removal of the material which is trimmed.

These objects and other advantages will become more apparent from the following specification and drawings.

BRIEF DESCRIPTION OF THE DRAWINGS

FIG. 1 is a general perspective view of an edging tool of this invention.

FIG. 2 is an enlarged, fragmentary exploded perspective view of a portion of the edging tool shown in FIG. 1.

FIG. 3 is a perspective view showing an opposite side of a cutting member shown in FIG. 2.

FIG. 4 is a perspective view with parts shown in section, drawn on a scale slightly smaller than FIG. 1, showing the use of the edging tool for trimming a lawn adjacent a walk and near an abutment, such as a step, as the tool is moved in one direction.

FIG. 5 is a perspective view with parts shown in section, similar to FIG. 4, showing the edging tool being operated for trimming the lawn adjacent the walk and very close to the abutment.

FIG. 6 is a sectional view taken substantially on line 6-6 of FIG. 4.

DESCRIPTION OF THE PREFERRED EMBODIMENT

FIG. 1 is a general perspective view of an edging tool 10 of this invention. The tool 10 includes an elongate handle or stem 12 having a cross bar 14 secured to the upper end thereof, with handgrips 16 secured to the ends of the cross bar 14 as shown. A cutting member 18 and a supporting wheel 20 are secured to the lower end of the stem 12.

The details of the assembly of the wheel 20 and cutting member 18 and the lower end of the stem 12 are shown in FIGS. 2 and 3. The lower end of the stem 12 has a flat portion 22, which is provided with holes 24 and 26. The cutting member 18 has a central portion 28 which is provided with holes 30 and 32 which are aligned with the holes 24 and 26, respectively, of the flat portion 22 of the stem 12. A fastener 34 extends through the holes 30 and 24, and another fastener 36 extends through the holes 32 and 26; these are used in conjunction with nuts 38 to secure the cutting member 18 to the flat portion 22 of the stem 12. The wheel 20 is rotatably mounted on a shouldered fastener 42 which is inserted through a hole 44 in the central portion 28 of the cutting member 18. A suitable lock washer 46 and nut 48 are used to secure the shouldered fastener 42 and the wheel 20 to the cutting member 18.

The details of the cutting member 18 are shown in FIGS. 1, 2, and 3. The cutting member 18 has first and second curved plane portions 50 and 52, respectively, which are located on opposed sides of the central portion 28. The curved plane portions 50 and 52 have lower cutting edges 54 and 56, respectively, which lie within a plane which is substantially perpendicular to the elongate stem 12. The curved plane portions 50 and 52 are concave and have guide edges 58 and 60, respectively. The guide edges 58 and 60 lie in a plane which is substantially perpendicular to the axis of rotation of the wheel 20 and which plane is located between the wheel 20 and the curved plane portions 50 and 52. The cutting member 18 is preferably made of metallic material. The axis of rotation of the wheel 20 is substantially equidistant from the cutting edges 54 and 56.

The edging tool 10 is used in the manner illustrated in FIGS. 4 and 5. An operator manually grasps the grips 16 of the cross bar 14, as shown, as the wheel 20 is supported upon a surface 62, such as a walk, at an edge thereof. The walk or surface 62 terminates at a step 64. The stem 12 is held at an angle to maintain the first cutting edge 54 within the grass sod at the edge of the walk 62. The edging tool 10 is pushed toward the step 64 with the guide edge 58 (FIG. 3) bearing against the edge of the walk 62 to guide the tool 10. Because of the concave shape of the curved plane portion 50, the sod or dirt at the edge of the walk 62 which is moved upwardly by movement of the tool 10, falls on the surface of the walk 62, from which it can be easily cleaned. As the tool 10 comes close to the step 64, the operator stops the forward motion of the tool 10, and pivots the stem 12 in a clockwise direction (as shown in FIG. 5) about the wheel 20 and lowers the stem 12 to force the cutting edge 56 into the sod. He then pushes the edging tool 10 in a direction away from the step 64 to thereby trim the sod at the edge of the walk 62 and near the step 64. The edging tool 10 of this invention which has two opposed cutting edges 54 and 56 is thus capable of trimming a strip at the edge of a walk 62 at a location adjacent a step 64 or other abutment, as well as along the length of the walk 62.

The invention having thus been described, I claim the following:

1. An edging tool adapted to be supported on a solid surface adjacent and edge thereof and to trim a sod area adjacent said edge, comprising:

An elongate stem, a cutting member secured to one end of said stem, the cutting member having a first cutting edge and a second cutting edge, the cutting member being attached to the stem so that the first and second cutting edges of the cutting member extend laterally in opposite directions from the stem, said cutting member having first and second curved plane portions terminating in said first and second cutting edges, respectively, said first and second curved plane portions being concavely shaped, the first and second cutting edges lying substantially within a plane which is substantially perpendicular to said elongate stem, a rotatable wheel supporting the cutting member and the stem, said rotatable wheel having an axis of rotation which is substantially parallel to the elongate stem and substantially parallel to a plane in which the first and second cutting edges are located, said axis of rotation being located equidistantly from said cutting edges, the wheel being adapted to move upon said solid surface adjacent an edge thereof, the cutting member being so attached to the stem that when the stem is tilted in one direction, the first cutting edge is within the sod, and when the stem is tilted in the opposite direction, the second cutting edge is within the sod, said first cutting edge being used to trim the sod area along a given edge of the solid surface when said cutting member is moved in a first direction, said second cutting edge being used to trim said sod area along the given edge of the solid surface when said cutting member is moved in the opposite direction.

2. The tool as defined in claim 1 in which said first and second curved plane portions also terminate in first and second guiding edges, respectively.

3. The tool as claimed in claim 2 in which said first and second guiding edges lie in a plane which is substantially perpendicular to the axis of rotation of said wheel and which plane lies between said wheel and said first and second curved plane portions.